US011517953B2

(12) United States Patent
Zhou et al.

(10) Patent No.: US 11,517,953 B2
(45) Date of Patent: Dec. 6, 2022

(54) NUMERICAL CONTROL MACHINE FOR STRETCH BENDING AND MONITORING METHOD FOR CLAMPING FORCE OF ROUND CLAMP THEREOF

(71) Applicant: HEFEI UNIVERSITY OF TECHNOLOGY, Hefei (CN)

(72) Inventors: Lihua Zhou, Hefei (CN); Zhenxin Cao, Hefei (CN)

(73) Assignee: HEFEI UNIVERSITY OF TECHNOLOGY, Hefei (CN)

(*) Notice: Subject to any disclaimer, the term of this patent is extended or adjusted under 35 U.S.C. 154(b) by 566 days.

(21) Appl. No.: 16/719,929

(22) Filed: Dec. 18, 2019

(65) Prior Publication Data

US 2020/0230680 A1 Jul. 23, 2020

(30) Foreign Application Priority Data

Jan. 22, 2019 (CN) .......................... 201910057759.6

(51) Int. Cl.
*B21D 11/02* (2006.01)
*G05B 19/18* (2006.01)

(52) U.S. Cl.
CPC ............ *B21D 11/02* (2013.01); *G05B 19/182* (2013.01); *G05B 2219/36203* (2013.01); *G05B 2219/41273* (2013.01)

(58) Field of Classification Search
CPC ... B21D 5/01; B21D 5/05; B21D 7/02; B21D 11/02; B21D 25/04; B25B 5/00; G05B 19/182; G05B 2219/36203; G05B 2219/41273
See application file for complete search history.

(56) References Cited

U.S. PATENT DOCUMENTS

| 3,082,809 | A | * | 3/1963 | Petsch | .................... | B21D 25/00 |
| | | | | | | 72/302 |
| 5,606,886 | A | * | 3/1997 | Polen | ..................... | B21D 11/02 |
| | | | | | | 72/296 |
| 2005/0247100 | A1 | * | 11/2005 | Taylor | ................. | B23B 31/1253 |
| | | | | | | 72/296 |

FOREIGN PATENT DOCUMENTS

WO WO-2015185035 A1 * 12/2015 ............... B21D 1/00

OTHER PUBLICATIONS

Busch, Translation of WO-2015185035 (Year: 2015).*

* cited by examiner

*Primary Examiner* — Adam J Eiseman
*Assistant Examiner* — Bobby Yeonjin Kim
(74) *Attorney, Agent, or Firm* — Hemisphere Law, PLLC; Zhigang Ma

(57) ABSTRACT

A NC machine for stretch bending and monitoring method for clamping force of round clamp thereof is invented, which includes a round head clamp, a hydraulic system and a clamping force monitoring device. The round head clamp includes a housing, an internal module arranged in the housing and a positioning member for positioning the internal module in the housing. The hydraulic system includes a hydraulic rod and a hydraulic ram for pushing the hydraulic rod. The clamping force monitoring device includes a sensor and a data processing module. The present invention is suitable for the workpiece of different shapes and sizes. In this invention, the clamping force can be adjusted in real time when it needs to be changed, and this not only can avoid the problems of excessive energy consumption, excessive clamping marks and damage of the workpiece, but also save energy and protect the workpiece.

17 Claims, 10 Drawing Sheets

NUMERICAL CONTROL MACHINE FOR STRETCH BENDING AND MONITORING METHOD FOR CLAMPING FORCE OF ROUND CLAMP THEREOF

FIELD OF THE INVENTION

The present invention relates to technical field of a numerical control (NC) machine, and more particularly to a monitoring method for clamping of round clamp thereof.

BACKGROUND OF THE INVENTION

Stretch bending is the forming method of NC machine using its clamp and die to bend a workpiece to be formed into a workpiece which has a certain curvature, shape and size. The method is widely used in all kinds of steel pipe, square tube, H-section steel, I-beam, channel steel, angle iron, flat iron and aluminum profile of the section below 500 mm in cold bending.

The clamp is an important part of the numerical control machine, and its main function is to hold the workpiece to be processed. The clamp is usually a square clamp, but specifically the corresponding size of the clamp design is according to the shape size of the workpiece. However, each kind of the clamp can only hold the workpiece of specific size, and when it needs to hold the workpiece of different size, it needs to change the clamp, which not only wastes time and reduces the working efficiency of the machine tool, but also increases the production cost because of the redesign and manufacture of the clamp, so that cannot make full use of the existing resources. At the same time, the existing clamp of the numerical control machine generally sets the pressure of hydraulic cylinder according to experience, which cannot monitor the clamping force in real time, resulting in excessive energy consumption due to excessive clamping force, heavy clamping mark of workpiece and damage to the workpiece.

SUMMARY OF THE INVENTION

Therefore, the object of the present invention is to provide a numerical control machine for stretch bending, which obtains the clamping force in real time.

Another object of the present invention provides a monitoring method for clamping force of round clamp thereof, which is used by the numerical control machine to obtain the clamping force in real time.

The present invention provides a numerical control machine for stretch bending, which includes a round head clamp for clamping a workpiece, a hydraulic system for applying pressure to the round head clamp to clamp the workpiece and a clamping force monitoring device. The round head clamp includes a housing, an internal module arranged in the housing and a positioning member for positioning the internal module in the housing. The outer contour of the housing is in the shape of a frustum of a cone shape, and a positioning hole is arranged on the side wall of the housing. A mounting groove is arranged in the bottom end of the internal module, and the mounting groove is coaxial with the housing. The internal module includes a first component, a second component and a third component. The first component, the second component and the third component are axial setting around the housing and forming as a circular platform structure. The circular platform structure and the housing have the same cone angle, the first component and the second component are forming as a notched structure, and the third component is inserted into the notch of the notched structure and has an L-shaped clamping space with the first component. The positioning member connects the housing to the internal module through the positioning hole. The hydraulic system includes a hydraulic rod and a hydraulic ram for pushing the hydraulic rod. The hydraulic rod is mounted in the mounting groove, and applies thrust to the circular platform structure to clamp the workpiece in the L-shaped clamping space. The clamping force monitoring device includes a sensor and a data processing module. The sensor is set in the mounting groove and for detecting the pressure between the hydraulic rod and the internal module. The data processing module is used to calculate the clamping force between the internal module and the workpiece, and the clamping force is equal to the product of the pressure and the cotangent of half of the cone angle.

In the numerical control machine of the present invention, further includes an upper computer, which is for dynamically displaying the clamping force.

In the numerical control machine of the present invention, when the clamping force is less than a preset clamping pressure value, the upper computer drives the hydraulic ram to increase oil pressure, and when the clamping force is greater than the preset clamping pressure value, the upper computer drives the hydraulic ram to reduce oil pressure, so as to make the clamping force be equal to the preset clamping pressure value.

In the numerical control machine of the present invention, further includes an oil-electric servo control system, which for receiving control instruction sent by the upper computer and controlling the oil pressure of the hydraulic ram accordingly. The control instruction is used for driving the hydraulic ram to increase or reduce the oil pressure.

In the numerical control machine of the present invention, the upper computer sends the control instruction to the oil-electric servo control system by a clamping force control method which using a mathematical model.

In the numerical control machine of the present invention, the clamping force control method includes following steps: clamping workpieces made by different materials in the round head clamp; changing the oil pressure of the hydraulic ram; calculating the clamping force between various workpieces and the internal module to obtain the mathematical relationship between the clamping force and the oil pressure, then establishing a corresponding mathematical model; and according to the mathematical model and the clamping force, carrying on the closed loop control to the hydraulic system by the oil-electric servo control system.

In the numerical control machine of the present invention, the data processing module includes a cone angle computation unit and a clamping force computation unit; the cone angle computation unit is used to calculate the cone angle, the clamping force computation unit is used to calculate the clamping force.

In the numerical control machine of the present invention, the cone angle computation unit is used to calculate the difference between the top radius and the bottom radius of the circular platform structure, then calculate the arctangent between the difference and the height value of the circular platform structure; the clamping force computation unit is used to calculate the clamping force.

In the numerical control machine of the present invention, the mounting groove includes a round hole and a disc cavity coaxial with the round hole; the radius of the disc cavity is larger than the radius of the round hole.

In the numerical control machine of the present invention, the hydraulic rod has a circular disc, and the radius of the circular disc is larger than the radius of the round hole; the circular disc is set in the disc cavity.

In the numerical control machine of the present invention, the two ends of the second component are in the shape of an inferior arc bow.

In the numerical control machine of the present invention, the round hole is set in the second component and the third component.

In the numerical control machine of the present invention, the positioning member is a positioning pin.

In the numerical control machine of the present invention, the positioning hole is strip-shaped and extends parallel to the outer contour line of the housing.

In the numerical control machine of the present invention, the sensor is a pressure sensor which is fixed on the wall of the mounting groove, and the detection end of the sensor is in contact with the hydraulic rod.

In the numerical control machine of the present invention, the workpiece is one of a steel pipe, a square pipe, an H-shaped steel, an I-steel, a channel steel, an angle iron, a flat iron and an aluminum profile.

The present invention also provides a monitoring method for clamping force of round clamp thereof, used by the numerical control machine. The monitoring method includes following steps: detecting the pressure between the hydraulic rod and the internal module; calculating the cone angle of the circular platform structure; and calculating the clamping force between the internal module and the workpiece, and the clamping force is equal to the product of the pressure and the cotangent of half of the cone angle.

In the monitoring method of the present invention, the method of calculating the cone angle includes following steps: calculating the difference between the top radius and the bottom radius of the circular platform structure; calculating a value which is the height value of the circular platform structure; and calculating the arctangent between the difference and the value.

In the monitoring method of the present invention, further includes following steps: comparing the clamping force with a preset clamping pressure value; driving the hydraulic ram to increase oil pressure when the clamping force is less than a preset clamping pressure value; and driving the hydraulic ram to reduce oil pressure when the clamping force is greater than the preset clamping pressure value.

The present invention also provides a clamping force monitoring device for a round head clamp used by a numerical control machine. The numerical control machine further includes a hydraulic system for applying pressure to the round head clamp to clamp the workpiece, the round head clamp is used to clamp a workpiece. The round head clamp includes a housing, an internal module arranged in the housing, and a positioning member for positioning the internal module in the housing. The outer contour of the housing is in the shape of a frustum of a cone shape, and a positioning hole is arranged on the side wall of the housing. A mounting groove is arranged in the bottom end of the internal module, and the mounting groove is coaxial with the housing. The internal module includes a first component, a second component and a third component. The first component, the second component and the third component are axial setting around the housing and forming as a circular platform structure. The circular platform structure and the housing have the same cone angle. The first component and the second component are forming as a notched structure, the third component is inserted into the notch of the notched structure and has an L-shaped clamping space with the first component. The positioning member connects the housing to the internal module through the positioning hole. The hydraulic system includes a hydraulic rod and a hydraulic ram for pushing the hydraulic rod. The hydraulic rod is mounted in the mounting groove, and applies thrust to the circular platform structure to clamp the workpiece in the L-shaped clamping space. The clamping force monitoring device includes a detection mechanism, a cone angle computation unit and a clamping force computation unit. The detection mechanism is for detecting the pressure between the hydraulic rod and the internal module. The detection mechanism includes a pressure sensor which is fixed on the wall of the mounting groove, and the detection end of the sensor is in contact with the hydraulic rod. The cone angle computation unit is for calculating the difference between the top radius and the bottom radius of the circular platform structure, then calculating the arctangent between the difference and a value which is the height value of the circular platform structure. The clamping force computation unit is for calculating the clamping force between the internal module and the workpiece, and the clamping force is equal to the product of the pressure and the cotangent of half of the cone angle.

Solution of the present invention, for solving the above problem, is that apply the numerical control machine which can obtain the clamping force in real time. The hydraulic rod of the hydraulic system pushes the internal module to make the first component, the second component and the third component interact with each other, which forms a self-lock in the housing to realize the clamping of the workpiece. Due to the structure of the third component is according to the shape and size of the workpiece to be processed, therefore the size of the L-shaped clamping space is adjustable. In this way, the present invention is suitable for the workpiece of different shapes and sizes. In addition, the present invention not only does not need to replace the chuck, but also can improves the workpiece's forming quantity, the working efficiency and the utilization rate of resources.

Moreover, the clamping force monitoring device is able to calculate the pressure between the hydraulic rod and the internal module, so that the data processing can calculate the clamping force between the internal module and the workpiece. Since the clamping force varies with the pressure, therefore the real-time monitoring of the clamping force can be realized by detecting the magnitude of the pressure. In this invention, the clamping force can be adjusted in real time when it needs to be changed, and this not only can avoid the problems of excessive energy consumption, excessive clamping marks and damage of the workpiece, but also save energy and protect the workpiece.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

First Embodiment

Figure 1:
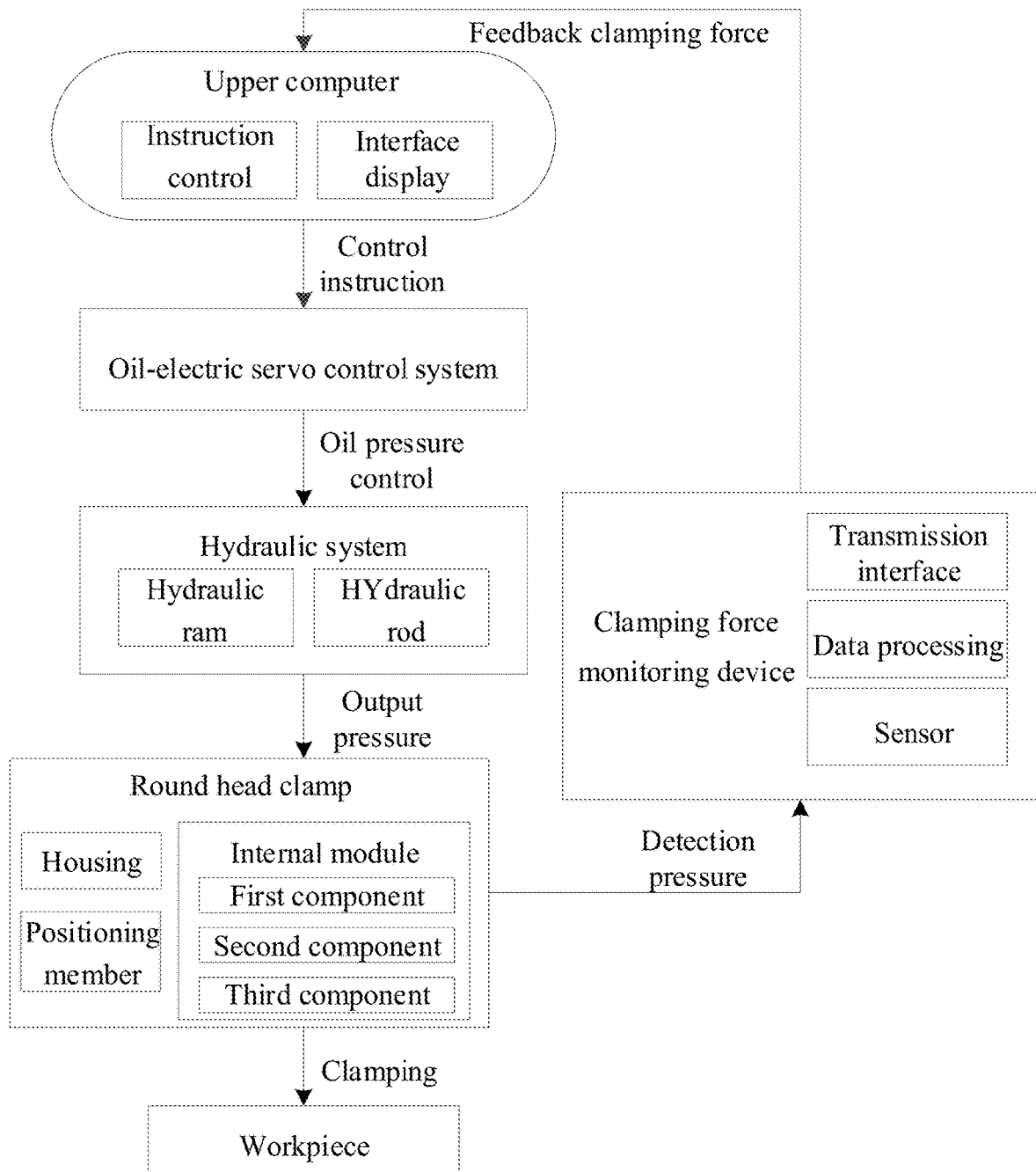
FIG. 1 is a system frame diagram of the numerical control machine for stretch bending, according to the first embodiment of the present invention.
Figure 2:
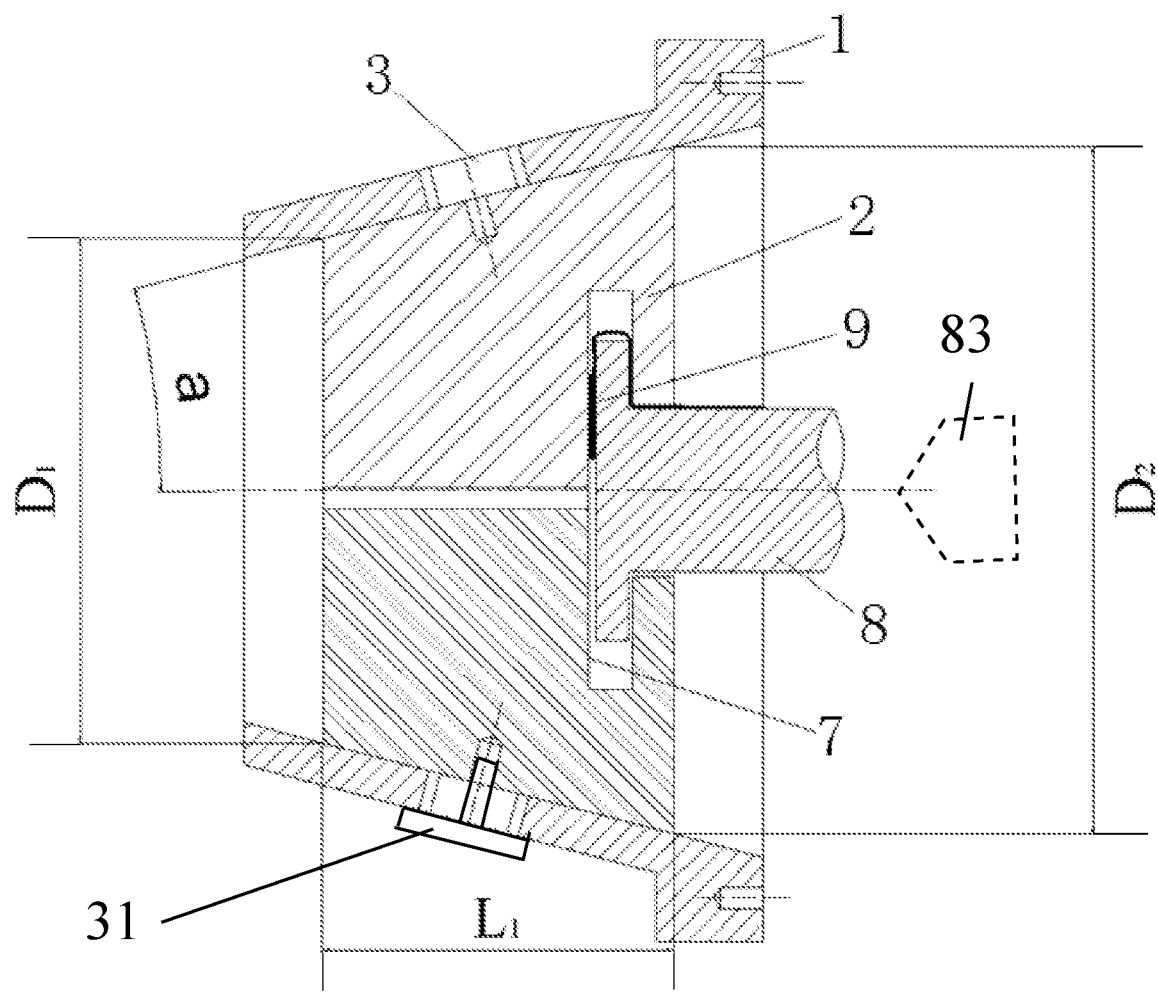
FIG. 2 is a cross-sectional diagram of the round head clamp in connection with the hydraulic rod, according to the first embodiment of the present invention.

Referring to FIGS. 1 and 2, a numerical control machine for stretch bending is shown as an embodiment. The numerical control machine is simply a NC machine, and the machine includes a round head clamp, a hydraulic system and a clamping force monitoring device, in this embodiment, the machine further includes an upper computer and an oil-electric servo control system. The machine is used to draw and bend the workpiece; the workpiece is one of a steel pipe, a square pipe, an H-shaped steel, an I-steel, a channel steel, an angle iron, a flat iron and an aluminum profile.

The round head clamp is used for clamping a workpiece and can be arranged on other fixed structures of the numerical control machine. The round head clamp includes a housing 1, an internal module 2 and a positioning member 31.

Figure 3:
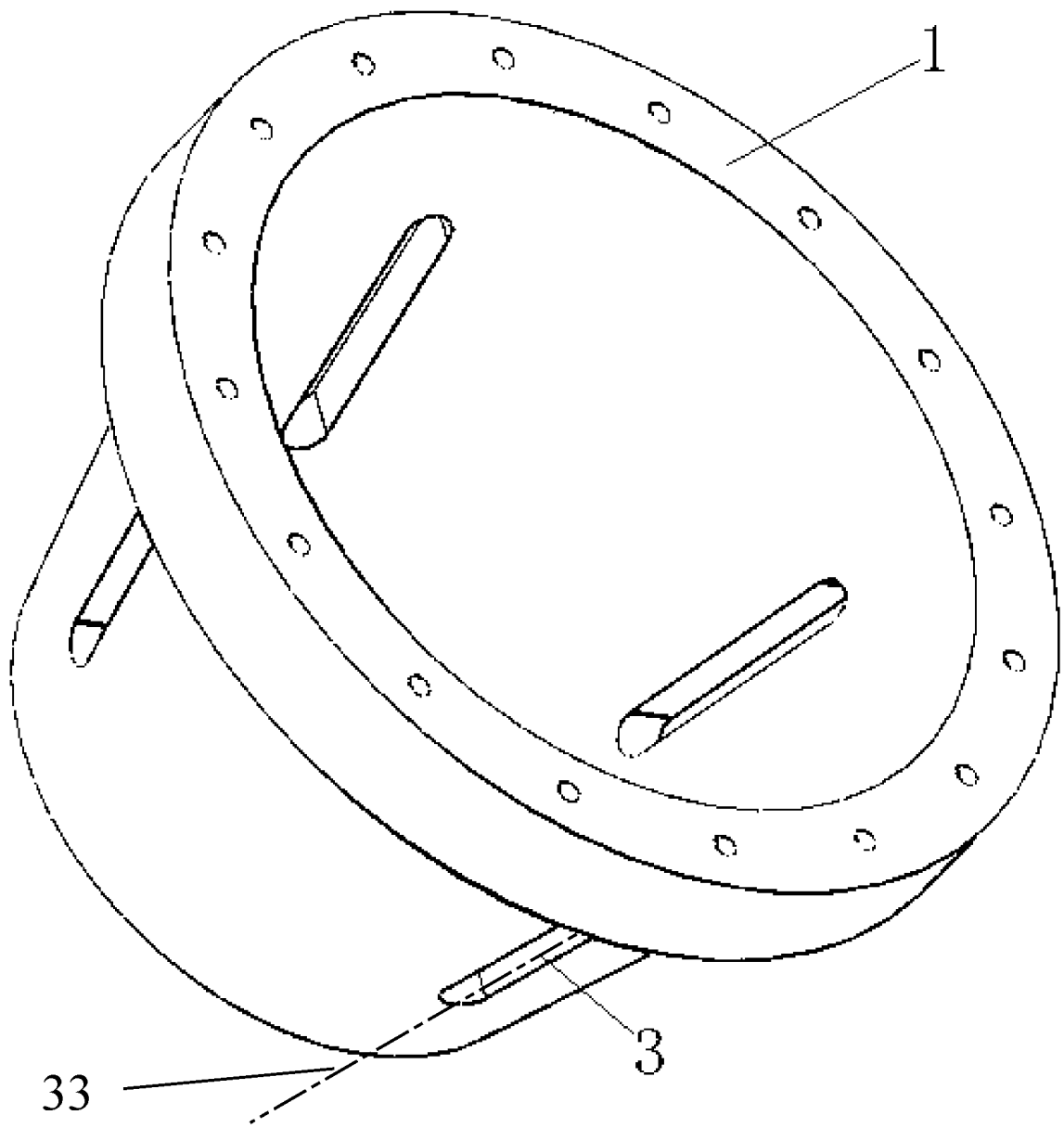
FIG. 3 is a perspective diagram of the housing of the round head clamp, according to the first embodiment of the present invention.

Referring to FIG. 3, the outer contour of the housing 1 is in the shape of a frustum of a cone shape, and a positioning hole 3 is arranged on the side wall of the housing 1. The positioning hole 3 is strip-shaped and extends parallel to the outer contour line 33 of the housing 1. In this embodiment, the positioning hole 3 is rounded at both ends in the direction of the outer contour line 33, so that the positioning member 31 is inserted and positioned, and the number of the positioning hole 3 is the same as the number of the positioning member, all of which can be four. The internal module 2 is arranged in the housing 1; the positioning member 31 is used to position the internal module 2 in the housing 1 and can be the positioning pin preferably. The positioning member 31 connects the housing 1 with the internal module 2 through the positioning hole 3.

Figure 4:
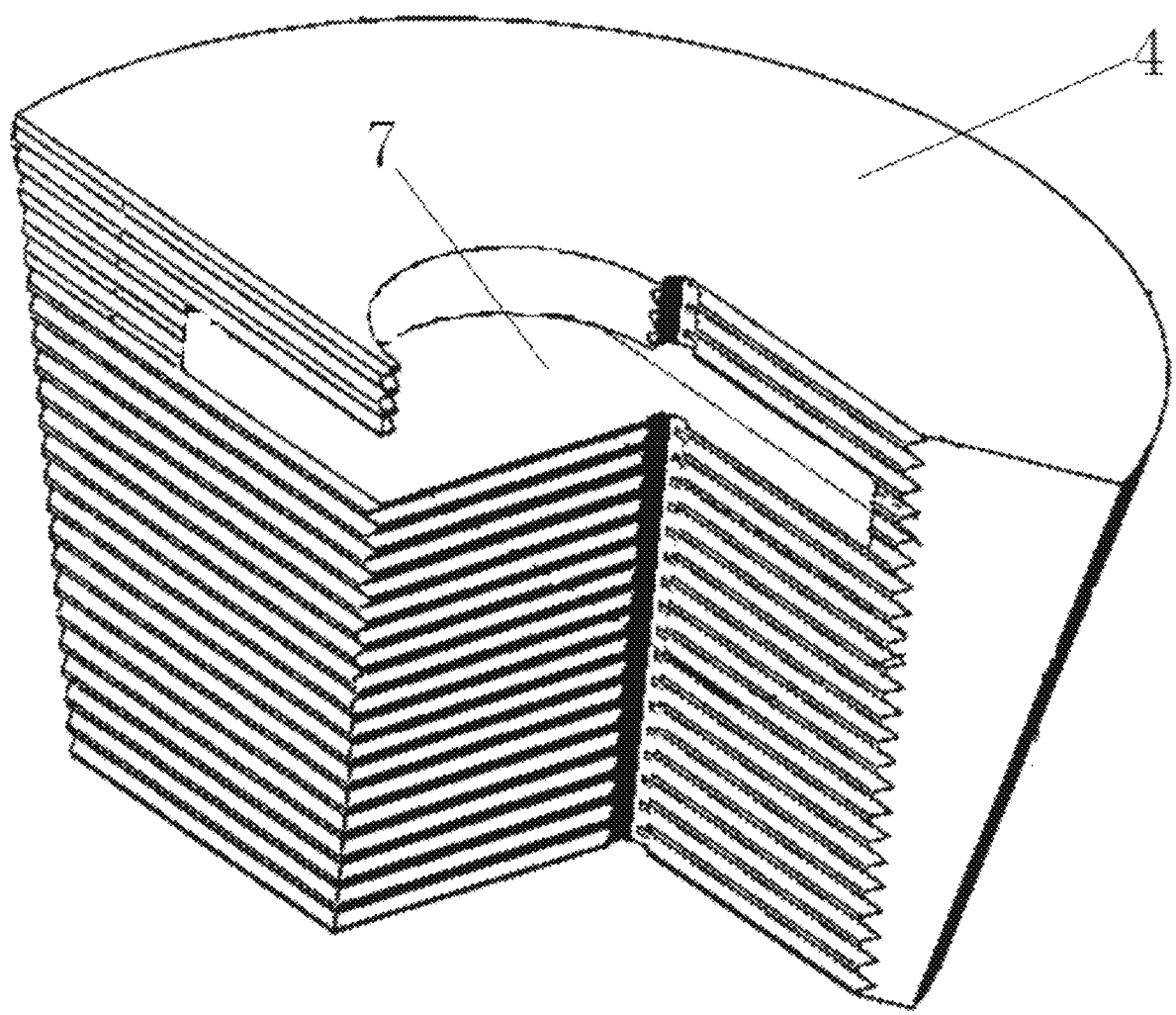
FIG. 4 is a perspective diagram of the first component of the internal module, according to the first embodiment of the present invention.
Figure 5:
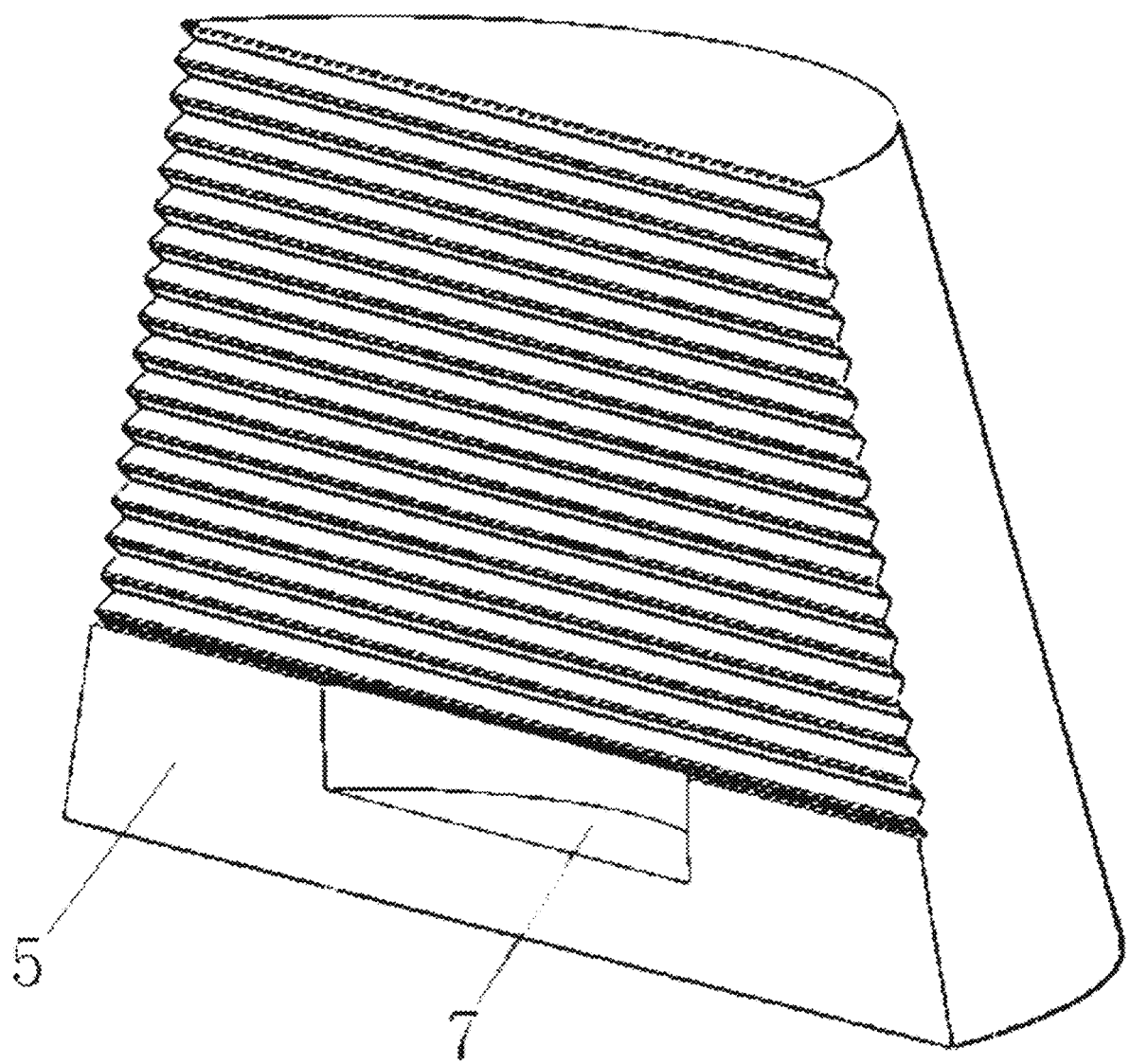
FIG. 5 is a perspective diagram of the second component of the internal module, according to the first embodiment of the present invention.
Figure 6:
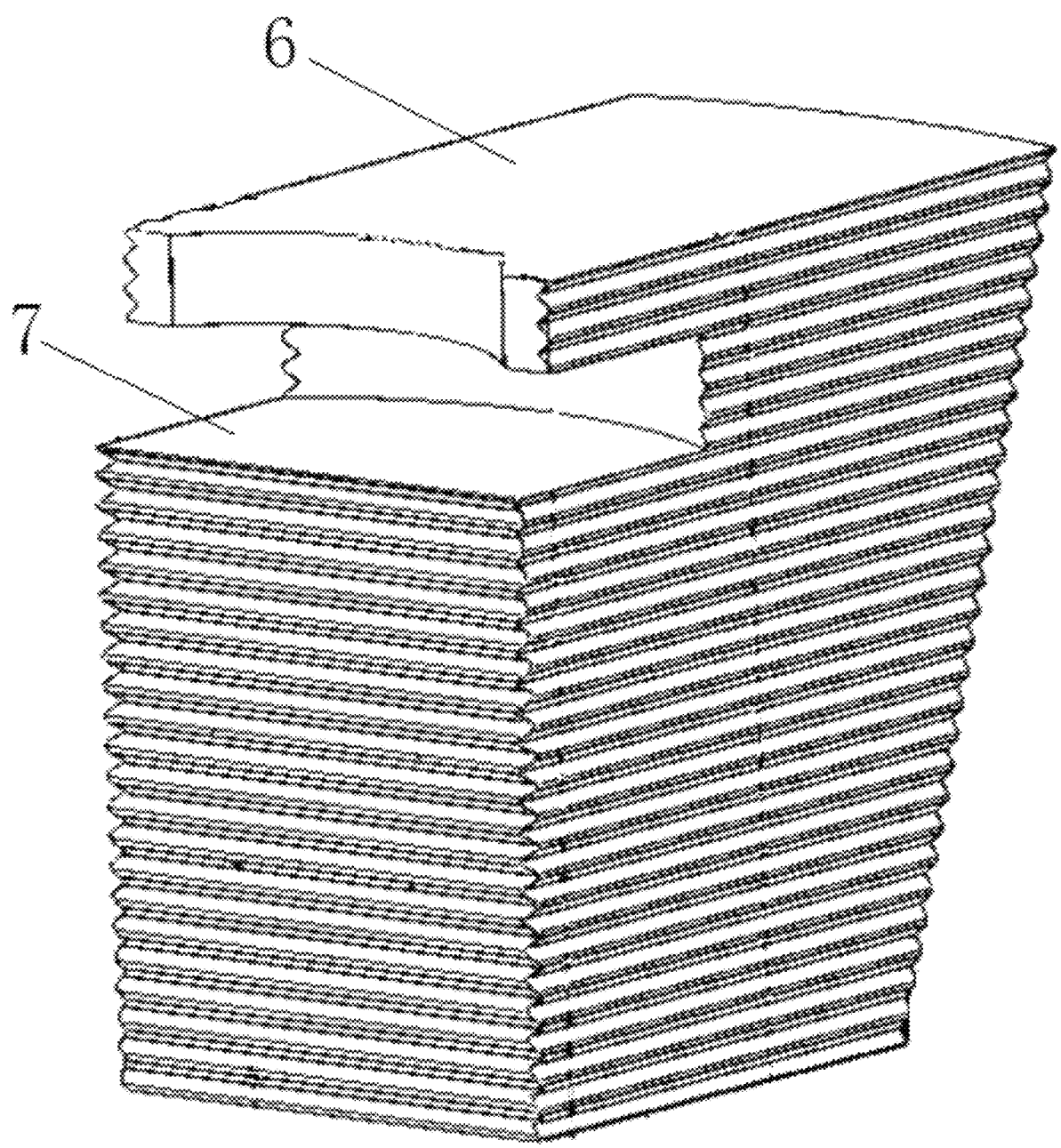
FIG. 6 is a perspective diagram of the third component of the internal module, according to the first embodiment of the present invention.

Referring to FIGS. 4, 5 and 6, a mounting groove 7 is arranged in the bottom end of the internal module 2, and the mounting groove 7 is coaxial with the housing 1. The internal module 2 includes a first component 4, a second component 5 and a third component 6. The first component 4, the second component 5 and the third component 6 are axial setting around the housing 1 and forming as a circular platform structure, the circular platform structure and the housing 1 have the same half of the cone angle α.

Figure 7:
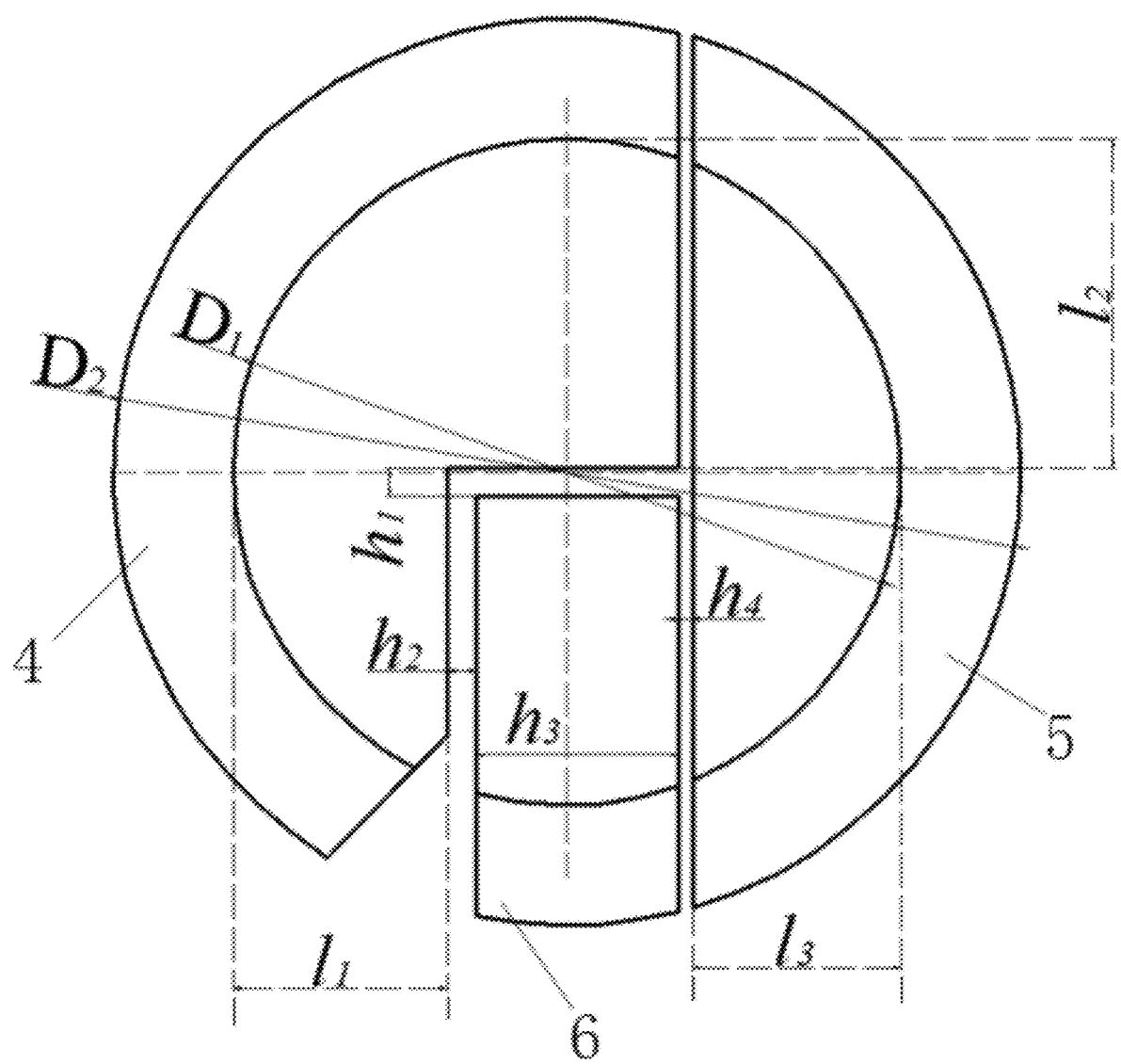
FIG. 7 is a schematic diagram of the internal module observed from the top to the bottom, according to the first embodiment of the present invention.
Figure 8:
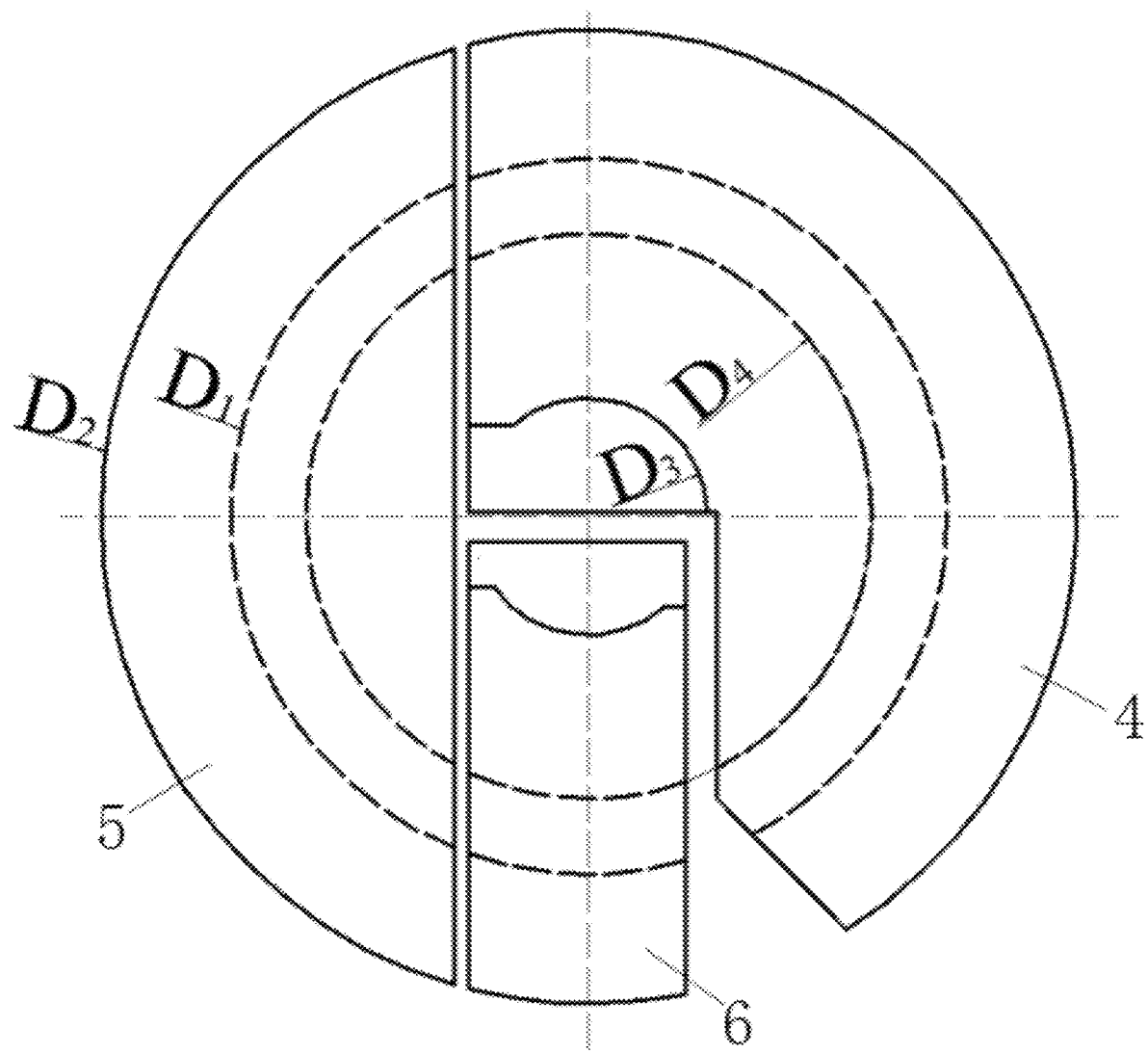
FIG. 8 is a schematic diagram of the internal module observed from the bottom to the top, according to the first embodiment of the present invention.

Furthermore, referring to FIG. 7 and FIG. 8, the first component 4 and the second component 5 are forming as a notched structure; the third component 6 is inserted into the notch of the notched structure and has an L-shaped clamping space with the first component 4. The positioning member connects the housing 1 to the internal module 2 through the positioning hole 3. Because there is a clamping space between the three components, and the size of the space can be adjusted by the third component 6, that is, to adjust the size of $h_1$ and $h_2$, therefore when clamping different shapes and sizes of workpiece, the clamping of workpiece can be realized only by changing third component 6 accordingly. While the size of third component 6 can be reduced, the waste of resources can be reduced and the forming efficiency of the machine can be improved.

Figure 9:
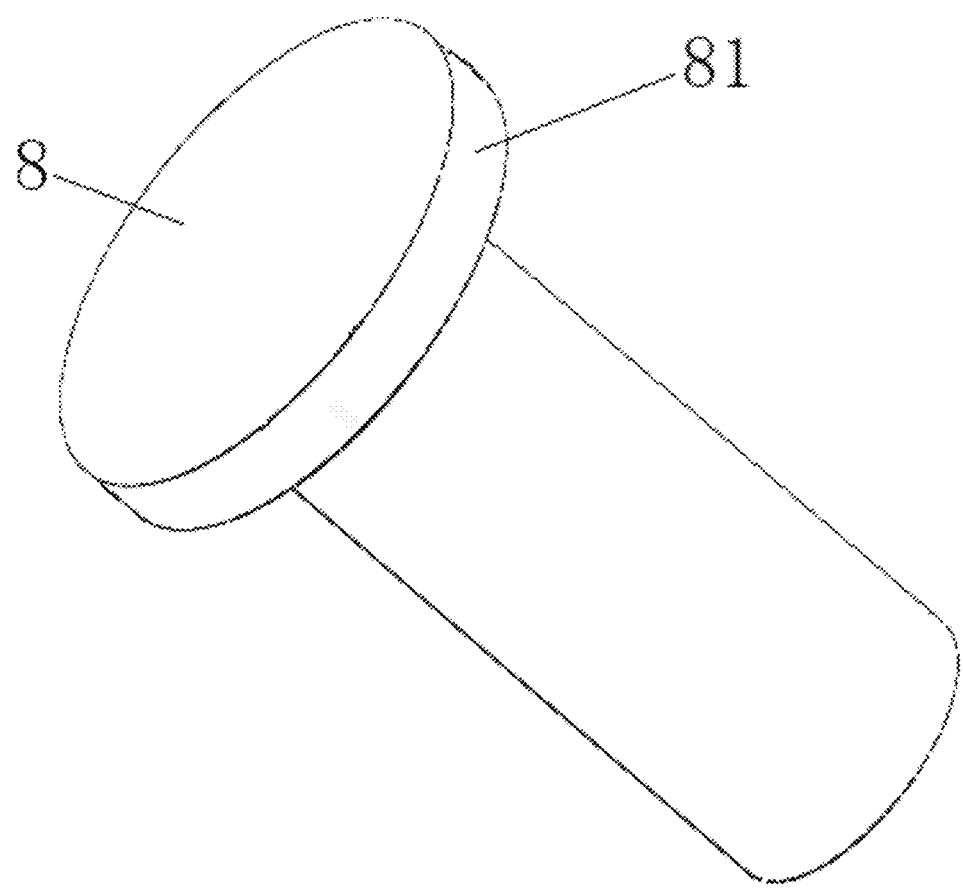
FIG. 9 is a perspective diagram of the hydraulic rod of the hydraulic system, according to the first embodiment of the present invention.

Referring to FIGS. 1, 8 and 9, the hydraulic system is used for applying pressure to the round head clamp to clamp the workpiece and includes a hydraulic rod 8 and a hydraulic ram 83 for pushing the hydraulic rod 8. The hydraulic rod 8 is mounted in the mounting groove 7, and applies thrust to the circular platform structure to clamp the workpiece in the L-shaped clamping space, the self-lock of the first component 4, the second component 5 and the third component 6 is formed at the same time.

Due to the circular platform structure has the same half of the cone angle α as the housing 1, thus when the internal module 2 is thrust, the internal module 2 will interact with the housing 1 to produce an interaction pressure so that the internal module 2 and the housing 1 are relatively fixed. Also, under the pressure between the housing 1 and the internal module 2, the three components will move toward the axis of symmetry along the radial direction and tighten the workpiece. Moreover, the three components form a self-lock, and lock each other, thus relatively fixed, so that the workpiece can be fixed relative to the housing 1, and then realize the clamping of the workpiece.

In this embodiment, the mounting groove 7 includes a round hole and a disc cavity coaxial with the round hole. The radius of the disc cavity is larger than the radius of the round hole. The two ends of the second component 5 are in the shape of an inferior arc bow, and the round hole is set in the second component 5 and the third component 6. The hydraulic rod 8 has a circular disc 81, and the radius of the circular disc 81 is larger than the radius of the round hole, the circular disc 81 is set in the disc cavity. In this manner, after the three components form the self-lock, the circular disc 81 is always located in the disc cavity, so that the hydraulic rod 8 and the internal module 2 form a connection relationship to prevent the hydraulic rod 8 from falling off.

It is also noted herein that the round head clamp and the hydraulic rod 8 in the present embodiment may be combined to form a machining clamp and may replace the clamp of the existing numerical control machine to carry out work. When the internal module 2 is applied, a thrust force may be applied to the hydraulic rod 8 by other structures so that the internal module 2 interacts with the housing 1 and holds the workpiece in the internal module 2. In this way, the processing clamp can be carried in a portable manner, so that the use range of the processing clamp can be improved in a different working environment.

In the numerical control machine with the above two structures, the hydraulic rod 8 pushes the internal module 2, so that the three components unite with each other, and the self-lock is formed in the housing 1 so as to realize the clamping of the workpiece. Due to the fact that the third component 6 can be set according to the shape and the size of the workpiece to be processed, the size of the L-shaped clamping space can be adjusted, and the clamping of a workpiece with different shapes and sizes can be realized without replacing the chuck. Therefore, the forming quantity of the workpiece is improved, the working efficiency of the machine is improved, and meanwhile the utilization rate of the resources is improved.

The clamping force monitoring device includes a sensor 9 and a data processing module. The sensor 9 is set in the mounting groove 7 and for detecting the pressure $F_0$ between the hydraulic rod 8 and the internal module 2. The sensor 9 can be a pressure sensor which is fixed on the wall of the mounting groove 7, and the detection end of the sensor is in contact with the hydraulic rod 8. The data processing module is used to calculate the clamping force $F_3$ between the internal module 2 and the workpiece, and the clamping force $F_3$ is equal to the product of the pressure and the cotangent of half of the cone angle α.

Figure 10:
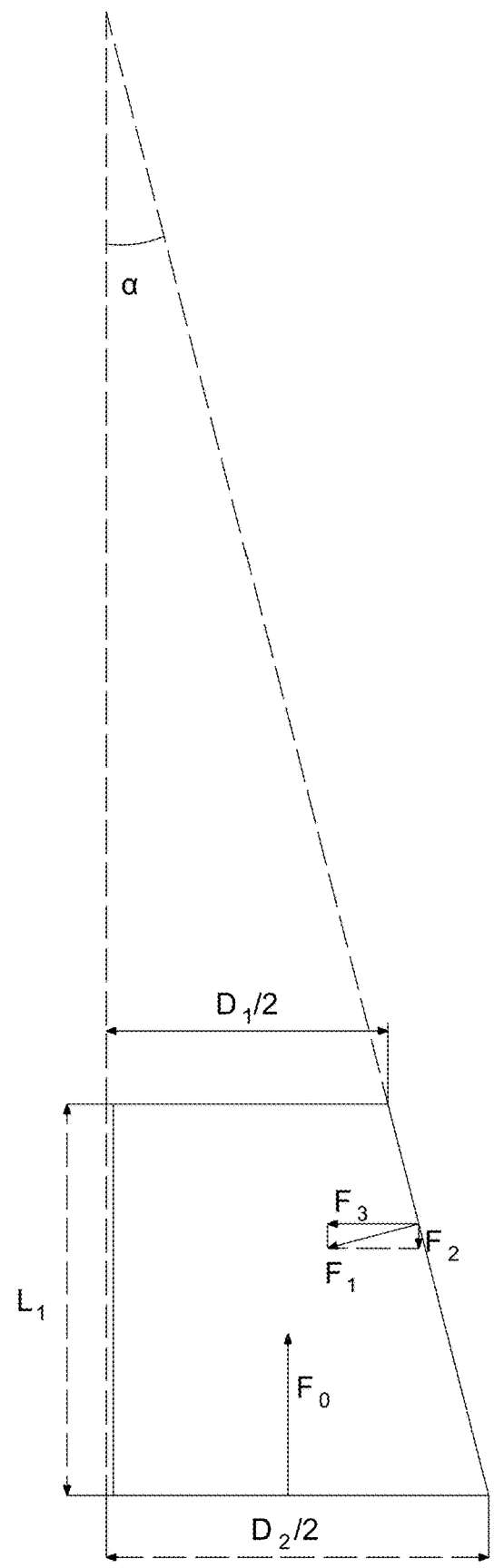
FIG. 10 is a force analysis diagram of the internal module of the round head clamp, according to the first embodiment of the present invention.

Referring to FIG. 10, the computation process of the clamping force $F_3$ is as follows. First, the size of half of the cone angle of the circular platform structure can be obtained by utilizing the triangular relationship of the internal module 2, thus the following formula can be obtained: $\alpha = \tan^{-1}[(D_2 - D_1)/(2*L_1)]$. Among them, $D_1$ is the top radius of the circular platform structure, $D_2$ is the bottom radius of the circular platform structure, and $L_1$ is the height of the circular platform structure. Then, according to the stress analysis of the internal module 2, the pressure $F_1$ of the internal module 2 is decomposed by the housing 1, and the following results are obtained: $F_2 = F_1 * \sin \alpha$, $F_3 = F_1 * \cos \alpha$. Finally, according to the principle of force balance, the following relations are obtained: $|F_2| = |F_0|$, thus the formula for calculating the clamping force $F_3$ is obtained: $F_3 = F_0 * \cot \alpha$.

In above embodiments, the data processing module includes a cone angle computation unit and a clamping force computation unit. The cone angle computation unit is used to calculate the cone angle; the clamping force computation unit is used to calculate the clamping force. The cone angle computation unit is used to calculate the difference between the top radius and the bottom radius of the circular platform structure, and then calculate the arctangent between the difference and a value which is the height value of the circular platform structure. The clamping force computation unit is used to calculate the clamping force.

In this way, the clamping force monitoring device monitors the clamping force, this makes the operator master the change of the clamping force in real time, and makes the corresponding treatment, so as to avoid excessive energy consumption and energy saving caused by the excessive clamping force. At the same time, using the device can avoid the occurrence of excessive clamping marks of the workpiece or the clamping of the workpiece, protect the workpiece and improve the forming effect of the machine.

The upper computer is used for dynamically displaying the clamping force, also, can control the hydraulic ram 9. When the clamping force is less than a preset clamping pressure value, the upper computer drives the hydraulic ram 9 to increase oil pressure, and when the clamping force is greater than the preset clamping pressure value, the upper computer drives the hydraulic ram 9 to reduce oil pressure, so as to make the clamping force be equal to the preset clamping pressure value. The upper computer can be the existing PC, and can also be a single-chip computer or other microcomputer equipment. The upper computer can dynamically control the hydraulic ram 9 according to the monitored clamping force, so that the clamping force can reach a preset value, and the energy consumption is maximized. And meanwhile, the work piece can be protected, and the forming of the workpiece can be realized.

The oil-electric servo control system is used for receiving control instruction sent by the upper computer and controlling the oil pressure of the hydraulic ram 9 accordingly. The control instruction is used for driving the hydraulic ram 9 to increase or reduce the oil pressure. In the present embodiment, the upper computer sends the control instruction to the oil-electric servo control system by a clamping force control method which using a mathematical model. The clamping force control method includes the following steps: clamping workpieces made by different materials in the round head clamp; changing the oil pressure of the hydraulic ram 9; calculating the clamping force between various workpieces and the internal module 2 to obtain the mathematical relationship between the clamping force and the oil pressure, then establishing a corresponding mathematical model; and according to the mathematical model and the clamping force, carrying on the closed loop control to the hydraulic system by the oil-electric servo control system.

As described above, the numerical control machine can obtain the clamping force in real time. The hydraulic rod 8 of the hydraulic system pushes the internal module 2 to make the first component 4, the second component 5 and the third component 6 interact with each other, which forms a self-lock in the housing 1 to realize the clamping of the workpiece. Due to the structure of the third component 6 is according to the shape and size of the workpiece to be processed, therefore the size of the L-shaped clamping space is adjustable. In this way, the present invention is suitable for the workpiece of different shapes and sizes. In addition, the present invention not only does not need to replace the chuck, but also can improves the workpiece's forming quantity, the working efficiency and the utilization rate of resources.

Moreover, the clamping force monitoring device is able to calculate the pressure between the hydraulic rod 8 and the internal module 2, so that the data processing can calculate the clamping force between the internal module 2 and the workpiece. Since the clamping force varies with the pressure, therefore the real-time monitoring of the clamping force can be realized by detecting the magnitude of the pressure. In this invention, the clamping force can be adjusted in real time when it needs to be changed, and this not only can avoid the problems of excessive energy consumption, excessive clamping marks and damage of the workpiece, but also save energy and protect the workpiece.

Second Embodiment

Referring to FIG. 2 again, a clamping force monitoring device for a round head clamp used by a numerical control machine is shown as an embodiment. The numerical control machine includes the hydraulic system mentioned in the first embodiment. The round head clamp is the round head clamp mentioned in the first embodiment. Actually, the difference between the numerical control machine in this embodiment and the machine in the first embodiment is that the clamping force monitoring device exists independently in this embodiment. The clamping force monitoring device in the present embodiment includes a detection mechanism, a cone angle computation unit and a clamping force computation unit.

The detection mechanism is used for detecting the pressure between the hydraulic rod 8 and the internal module 2. The detection mechanism includes a pressure sensor which is fixed on the wall of the mounting groove 7, and the detection end of the sensor is in contact with the hydraulic rod 8. In other embodiments, the pressure sensor can be replaced by other detection structure which can detect the pressure.

The cone angle computation unit is used for calculating the difference between the top radius and the bottom radius of the circular platform structure, then calculating the arctangent between the difference and a value which is the height value of the circular platform structure. The clamping force computation unit is used for calculating the clamping force between the internal module 2 and the workpiece, and the clamping force is equal to the product of the pressure and the cotangent of half of the cone angle. What needs to be explained here is that the cone angle computation unit and the clamping force computation unit can be combined into a module just like the clamping force monitoring device in the first embodiment.

In this way, the numerical control machine can adjust the clamping force in real time, and avoid the excessive energy consumption caused by the excessive clamping force, the excessive clamping marks of the workpiece and the problem of the clamping of the workpiece, so as to save energy and protect the workpiece at the same time.

Third Embodiment

A monitoring method for clamping force of round clamp thereof is shown as an embodiment. The monitoring method is used by the numerical control machine according to the first embodiment, and includes the following steps: (1) detecting the pressure between the hydraulic rod 8 and the internal module 2; (2) calculating the cone angle of the circular platform structure; and (3) calculating the clamping force between the internal module 2 and the workpiece, and the clamping force is equal to the product of the pressure and the cotangent of half of the cone angle.

In some embodiments, the method of calculating half of the cone angle includes:
calculating the difference between the top radius and the bottom radius of the circular platform structure; calculating a value which is the height value of the circular platform structure; and calculating the arctangent between the difference and the value.

Moreover, the monitoring method further includes the following steps: (4) comparing the clamping force with a preset clamping pressure value; (5) driving the hydraulic ram 9 to increase oil pressure when the clamping force is less than a preset clamping pressure value; and (6) driving the hydraulic ram 9 to reduce oil pressure when the clamping force is greater than the preset clamping pressure value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A numerical control machine for stretch bending, comprising:
    a round head clamp, for clamping a workpiece; the round head clamp comprising:
        a housing, the outer contour of the housing being in the shape of a frustum of a cone shape, and a positioning hole arranged on the side wall of the housing;
        an internal module arranged in the housing; a mounting groove arranged in the bottom end of the internal module, and the mounting groove being coaxial with the housing; the internal module comprising:
            a first component;
            a second component; and
            a third component; the first component, the second component and the third component axial setting around the housing and forming as a circular platform structure, the circular platform structure and the housing having a same cone angle; the first component and the second component forming as a notched structure, the third component inserted into the notch of the notched structure and having an L-shaped clamping space with the first component; and
        a positioning member for positioning the internal module in the housing, connecting the housing to the internal module through the positioning hole;
    a hydraulic system, for applying pressure to the round head clamp to clamp the workpiece, comprising:
        a hydraulic rod, the hydraulic rod mounted in the mounting groove, and applied thrust to the circular platform structure to clamp the workpiece in the L-shaped clamping space; and
        a hydraulic ram for pushing the hydraulic rod; and
    a clamping force monitoring device, comprising:
        a sensor, the sensor set in the mounting groove and for detecting the pressure between the hydraulic rod and the internal module; and
        a data processing module; the data processing module used to calculate the clamping force between the internal module and the workpiece, and the clamping force being equal to the product of the pressure and the cotangent of half of the same cone angle.

2. The numerical control machine according to claim 1, further comprising:
    an upper computer, for dynamically displaying the clamping force.

3. The numerical control machine according to claim 2, wherein when the clamping force is less than a preset clamping pressure value, the upper computer drives the hydraulic ram to increase oil pressure, and when the clamping force is greater than the preset clamping pressure value, the upper computer drives the hydraulic ram to reduce oil pressure, so as to make the clamping force be equal to the preset clamping pressure value.

4. The numerical control machine according to claim 3, further comprising:
    an oil-electric servo control system, for receiving control instruction sent by the upper computer and controlling the oil pressure of the hydraulic ram accordingly, the control instruction used for driving the hydraulic ram to increase or reduce the oil pressure.

5. The numerical control machine according to claim 4, wherein the upper computer is configured to send the control instruction to the oil-electric servo control system by a clamping force control method using a mathematical model.

6. The numerical control machine according to claim 5, wherein the clamping force control method comprises:
- clamping workpieces made by different materials in the round head clamp;
- changing the oil pressure of the hydraulic ram;
- calculating the clamping force between various workpieces and the internal module to obtain the mathematical relationship between the clamping force and the oil pressure, then establishing a corresponding mathematical model; and
- according to the mathematical model and the clamping force, carrying on a closed loop control to the hydraulic system by the oil-electric servo control system.

7. The numerical control machine according to claim 1, wherein the mounting groove comprises a round hole and a disc cavity coaxial with the round hole; the radius of the disc cavity is larger than the radius of the round hole.

8. The numerical control machine according to claim 7, wherein the hydraulic rod has a circular disc, and the radius of the circular disc is larger than the radius of the round hole; the circular disc is set in the disc cavity.

9. The numerical control machine according to claim 8, wherein the two ends of the second component are in the shape of an inferior arc bow.

10. The numerical control machine according to claim 9, wherein the round hole is set in the second component and the third component.

11. The numerical control machine according to claim 8, wherein the positioning member is a positioning pin.

12. The numerical control machine according to claim 8, wherein the positioning hole is strip-shaped and extends parallel to an outer contour line of the housing.

13. The numerical control machine according to claim 1, wherein the sensor is a pressure sensor which is fixed on the wall of the mounting groove, and the detection end of the sensor is in contact with the hydraulic rod.

14. The numerical control machine according to claim 1, wherein the workpiece is one of a steel pipe, a square pipe, an H-shaped steel, an I-steel, a channel steel, an angle iron, a flat iron and an aluminum profile.

15. A monitoring method for clamping force of round clamp of a numerical control machine; the numerical control machine comprising:
- a round head clamp, for clamping a workpiece; the round head clamp comprising:
    - a housing, the outer contour of the housing being in the shape of a frustum of a cone shape, and a positioning hole arranged on the side wall of the housing;
    - an internal module arranged in the housing; a mounting groove arranged in the bottom end of the internal module, and the mounting groove being coaxial with the housing; the internal module comprising:
        - a first component;
        - a second component; and
        - a third component; the first component, the second component and the third component axial setting around the housing and forming as a circular platform structure, the circular platform structure and the housing having a same cone angle; the first component and the second component forming as a notched structure, the third component inserted into the notch of the notched structure and having an L-shaped clamping space with the first component; and
    - a positioning member for positioning the internal module in the housing, connecting the housing to the internal module through the positioning hole;
- a hydraulic system, for applying pressure to the round head clamp to clamp the workpiece, comprising:
    - a hydraulic rod, the hydraulic rod mounted in the mounting groove, and applied thrust to the circular platform structure to clamp the workpiece in the L-shaped clamping space; and
    - a hydraulic ram for pushing the hydraulic rod; and
- a clamping force monitoring device, comprising:
    - a sensor, the sensor set in the mounting groove and for detecting the pressure between the hydraulic rod and the internal module; and
    - a data processing module; the data processing module used to calculate the clamping force between the internal module and the workpiece, and the clamping force being equal to the product of the pressure and the cotangent of half of the same cone angle;

wherein the monitoring method comprises:
- detecting the pressure between the hydraulic rod and the internal module;
- calculating half of the cone angle of the circular platform structure; and
- calculating the clamping force between the internal module and the workpiece, and the clamping force is equal to the product of the pressure and the cotangent of half of the same cone angle.

16. The monitoring method according to claim 15, wherein the method of calculating half of the cone angle comprises:
- calculating the difference between the top radius and the bottom radius of the circular platform structure;
- calculating a value which is double a height value of the circular platform structure; and
- calculating the arctangent between the difference and the value.

17. The monitoring method according to claim 15, further comprising:
- comparing the clamping force with a preset clamping pressure value;
- driving the hydraulic ram to increase oil pressure when the clamping force is less than a preset clamping pressure value; and
- driving the hydraulic ram to reduce oil pressure when the clamping force is greater than the preset clamping pressure value.

* * * * *